Figure 1:
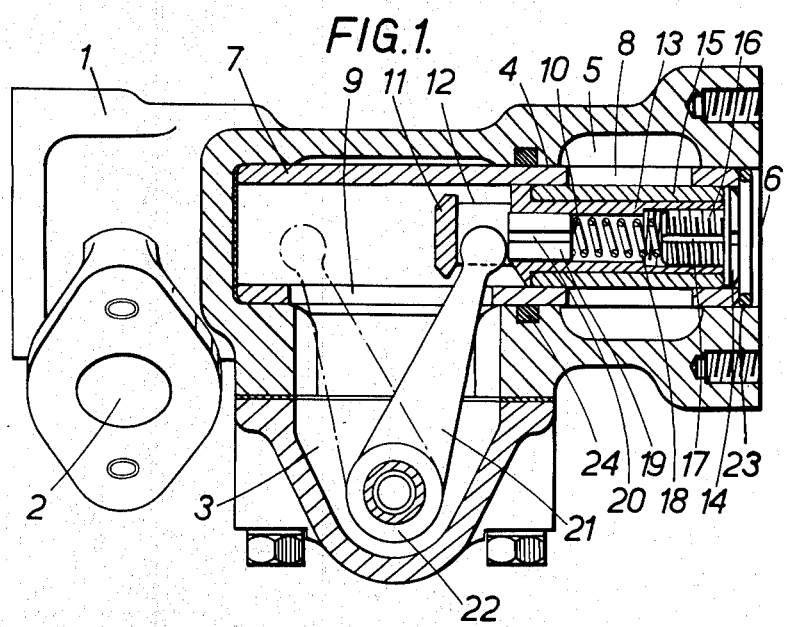

Jan. 4, 1966   R. M. PHILLIPS ETAL   3,227,417
PRESSURE BALANCED VALVE HAVING A CRANK ACTUATOR
Filed March 30, 1961

INVENTORS
RICHARD MORRISON PHILLIPS
DAVID JOHN LINDSAY-SCOTT
BY Morgan, Finnegan, Durham & Pine
ATTORNEYS 3,227,417
PRESSURE BALANCED VALVE HAVING
A CRANK ACTUATOR
Richard Morrison Phillips and David John Lindsay-Scott, London, England, assignors to The British Petroleum Company Limited, London, England, and The de Havilland Engine Company Limited, Leavesden, Hertfordshire, England, both British joint-stock corporations
Filed Mar. 30, 1961, Ser. No. 99,419
Claims priority, application Great Britain, Apr. 11, 1960, 12,790/60
3 Claims. (Cl. 251—260)

This invention relates to an improved valve. This invention also relates to an improved fluid blending unit.

According to the invention there is provided a valve comprising a piston slidably mounted in a cylinder, said cylinder having in its wall at least one port communicating with an inlet, the limits of movement of the piston being such that the port will be covered by the piston when this is raised and will be in communication with the interior of the cylinder, over the head of the piston, when the piston is withdrawn, the piston being provided with a passageway by which fluid pressure above and below the piston is equalised.

Preferably the surfaces of the piston and of the cylinder which are in contact are composed of different materials. Preferably one material is a ferrous metal and the other material is carbon. Suitably the cylinder is provided with a carbon surface; conveniently this will take the form of a carbon cylinder lining sleeve.

Preferably the piston core is transversely slotted near its lower end to provide a housing for one end of a pivoted actuating arm; a slot of suitable length will be provided in the cylinder wall to give clearance for the movement of this arm about a pivot point external to the cylinder. Suitably the pivot will be housed in a chest which, by reason of the passageway in the piston and clearance slot in the cylinder wall, will be in communication with the fluid undergoing control by the valve.

The valve hereinbefore described is particularly suitable for use in the control of fluids undergoing blending. For this purpose two of the valves are employed and are preferably mounted for operation of the actuating arms by means of a single control shaft. In general it will be desired to avoid seepage of fluid along the shaft from one chest to the other and if a single partitioning wall is employed the shaft will preferably be provided, at this position, with a sealing gland. For convenience, the valves will usually be mounted with the cylinders horizontal and with the valve chest below.

According to another aspect of this invention there is provided a blending system comprising a pair of ganged valves having a single operating shaft, said shaft being partially rotated, for the actuation of one valve or the other according to the requirements of blending, if desired, through a control arm, by means of an electromagnetic device adapted to receive at least one signal train and, in response to the signal or signals thereof, to move the operating shaft to a required position.

Preferably the ganged valves are each as hereinbefore described.

Preferably the electromagnetic device is adapted to receive two signal trains and, in response to individual signals, to move a control arm attached to said operating shaft whereby signals of a first train cause opening or further opening of a first valve, with sympathetic closing of the second valve and, similarly, signals of the second train cause opening or further opening of the second valve, with sympathetic closing of the first valve.

A suitable electromagnetic device for this purpose consists of a pair of solenoids, each having a moving component in association with the control arm. The moving component may be, for example, a sliding core or a pivoted arm. In the simple case, the moving component may constitute the control arm.

Another suitable electromagnetic device consists of a magnet centrally pivoted on a shaft and set within a field winding or windings of the type used in the apparatus known as a "mag-slip." Preferably two opposed windings are each tapped at two intermediate positions and a compound switch is provided to energise any one of the windings; by switching to an outer pair of sectors the magnet will be turned to one or other of two control positions. The shaft of the electromagnetic device will be connected directly or indirectly to the operating shaft of the ganged valves.

It is a particular advantage of the use of the valves hereinbefore described in this blending system that there is little or not back pressure on the actuating shafts and hence the energy requirements of the electromagnetic device are small.

The blending system hereinbefore described may be used in conjunction with a monitoring system whereby any variations in the composition of the blend from a desired composition are caused to give rise to control signals which are transmitted to the electromagnetic device whereby the balance of the two valves is adjusted or readjusted.

It will be appreciated that at the termination of a blending operation the valves may be in any position within the range of their mutually related positions, for example one being fully open and the other fully closed. To ensure that in a further blending operation the time required for the valves to reach balance is kept down, it is desirable to provide means for bringing the valves back to a mean position between blending operations. Preferably this is achieved by the provision of a sensing system in association with the actuating arms by means of which control signals are fed to the electromagnetic device until the arms are thereby caused to move to the desired position. Suitably this is achieved by the provision of two switch operating devices in association with the control arm. During blending the switches will be out of circuit; between blending operations these switches will be brought into a signal generating circuit, either manually or automatically; the switch operating device which is in contact with the control arm will cause the necessary signals to be transmitted to the electromagnetic device to bring the arm to a position in which neither switch operating device is in an operating position. It will be apparent that many variations may be made in the precise manner of moving the actuating arms. In accordance with the system herein described these variations lie within the present invention.

If it is desired to dispense only one of the blending components, a continuous signal may be fed to the electromagnetic device such that the valves are moved to and held in their appropriate extreme position of travel, thus completely opening the desired valve and completely closing the other.

Figure 2:
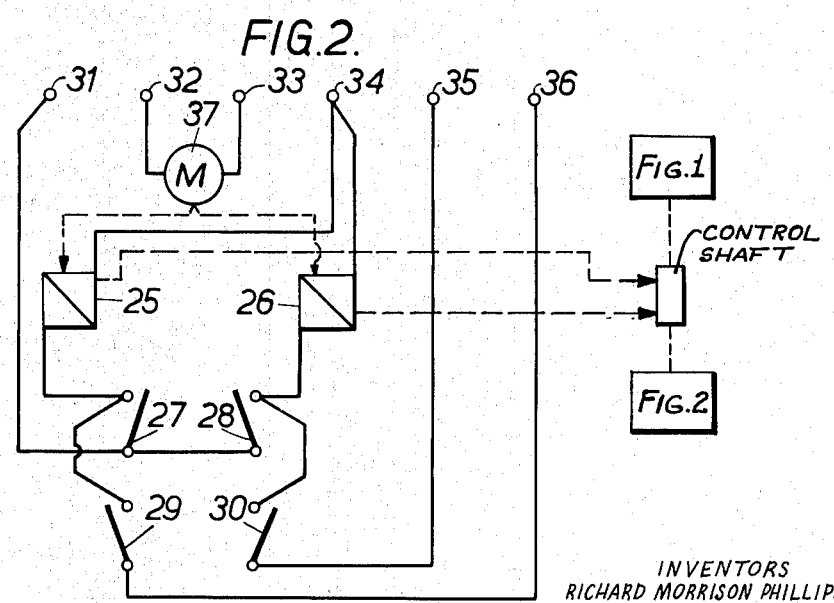

The invention is illustrated by but not limited with reference to the accompanying FIGURES 1 and 2, wherein FIGURE 1 is an elevation, partially in section, of one of a pair of ganged valves according to the invention and FIGURE 2 is a schematic diagram of valve centering mechanism and circuit.

With reference to FIGURE 1:

The valve comprises a valve body 1 having an inlet 2 connecting with an internal chamber 3 connected by means of a passageway 4 to an internal chamber 5, the chamber 5 having an outlet 6 which is a continuation of the passageway 4.

A cylindrical carbon sleeve 7 lines the passageway 4, extends throughout the chambers 3 and 5 and projects into the outlet 6. An aperture 8 and a slot 9 are cut in the sleeve 7.

A compound piston 10 is provided to slide within the sleeve 7. The piston 10 comprises a piston core having (a) a tail portion 11 into which is cut a slot 12, (b) a head portion in the form of a flanged hollow cylinder 13 and (c) a head plate 14. A stainless steel sleeve 15 surrounds the cylinder 13 in such manner that the rim of the flange and the wall of the sleeve 15 are flush with the wall of the sleeve 7. The cylinder 13 contains a pressure balance plug 16 having a central damping orifice 17, the plug 16 being retained in place by a spring 18 which is retained in place by a spring retaining plug 19 having a central orifice 20 in communication with the orifice 17.

The piston 10 is moved by means of a crank 21 journalled to the piston 10 in the slot 11 and mounted on a partially rotatable shaft 22 contained within the chamber 3. The crank 21 passes through the slot 9.

Sealing rings 25 and 24 are provided.

When the valve is in the closed position as shown in FIGURE 1, orifices 17 and 20 provide communication, and thereby damp pressure differences, between fluid downstream and upstream of the valve. With reference to FIGURE 2:

The valve centering mechanism comprises two clutch solenoids 25 and 26, two centering switches 27 and 28 and two limit switches 29 and 30.

Contacts 31, 34, 35 and 36, when energised, control the operation of the solenoid-actuated clutches 25 and 26. Contacts 32 and 33, when energised, supply current to the valve actuating motor 37 which transmits motion to a valve control shaft through the solenoid actuated clutch mechanisms 25 and 26. When the solenoid of 25 is energised motion is transmitted to the control shaft in one direction; when solenoid 26 is energised motion is transferred to the shaft in the other direction.

Subsequent to a fluid dispensing operation in which either or both members of the pair of ganged valves have been employed in a setting other than the mean position, either switch 27 or switch 28, according to the setting of the members, is closed and either the solenoid of 25 or the solenoid of 26 is energised, the appropriate clutch connection is made and the control shaft is motivated to move the members to their mean positions. To prevent over-travel of the members, limit switches 29 or 30 break the circuit when the mean positions are reached.

We claim:
1. A valve comprising a compound piston slidably mounted in a cylinder, said cylinder having in its wall at least one port communicating with an inlet, said piston having an inlet section communicating with said inlet and an outlet section, said piston being adapted for movement in such manner that the port is covered by the piston when the piston is in a forward position, and is in communication with the interior of the cylinder when the piston is in a withdrawn position, said piston being provided with a spring-biased balanced plug having a damping orifice therethrough and a plug having a damping orifice therethrough, said damping orifices being in communication for defining with the valve closed passageway means between said inlet section and said outlet section whereby fluid pressure on either side of said sections of the piston is equalised.

2. A valve according to claim 1 comprising a crank adapted to actuate said piston, the crank being journalled to the piston and being mounted on a shaft adapted partially to rotate on an axle external to the cylinder, a slot of suitable length being provided in the cylinder to give clearance for the movement of the crank.

3. A valve according to claim 2 comprising a chest wherein said axle is housed in a chest, the chest being in communication with fluid under-going control by the valve.

References Cited by the Examiner

UNITED STATES PATENTS

| | | | |
|---|---|---|---|
| 998,695 | 7/1911 | Kieser | 251—282 |
| 1,411,717 | 4/1922 | Frost | 251—282 |
| 1,836,132 | 12/1931 | Rosewood | 137—636.1 |
| 2,016,878 | 10/1935 | Vickers | 251—368 X |
| 2,410,404 | 11/1946 | Buchanan | 251—368 X |
| 2,494,491 | 1/1950 | Rosaen | 317—188 |
| 2,661,766 | 12/1953 | Adams | 251—51 |
| 2,734,529 | 2/1956 | Harrison | 251—368 X |
| 2,781,997 | 2/1957 | Berck | 251—51 |
| 2,969,090 | 1/1961 | Norton | 251—137 X |
| 3,042,843 | 7/1962 | Edwards | 317—188 |

ISADOR WEIL, *Primary Examiner.*

WILLIAM F. O'DEA, *Examiner.*